UNITED STATES PATENT OFFICE 1,946,754

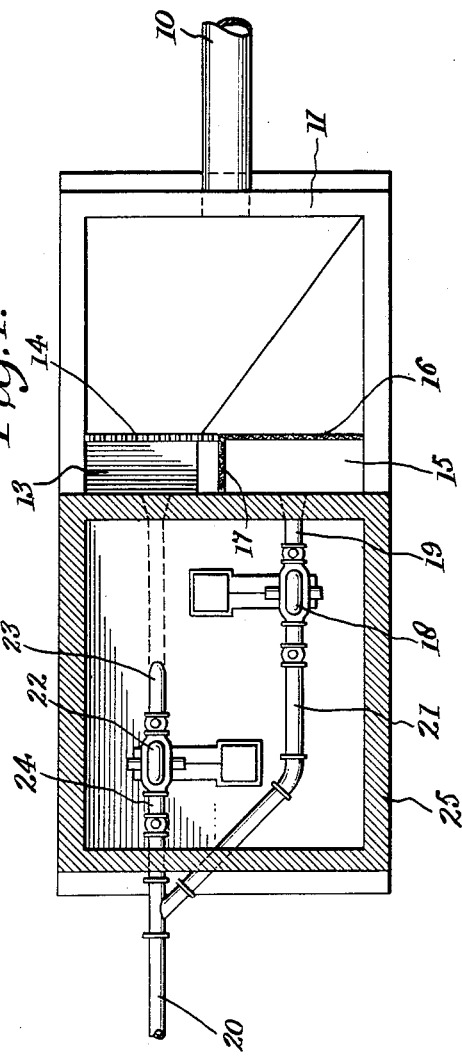
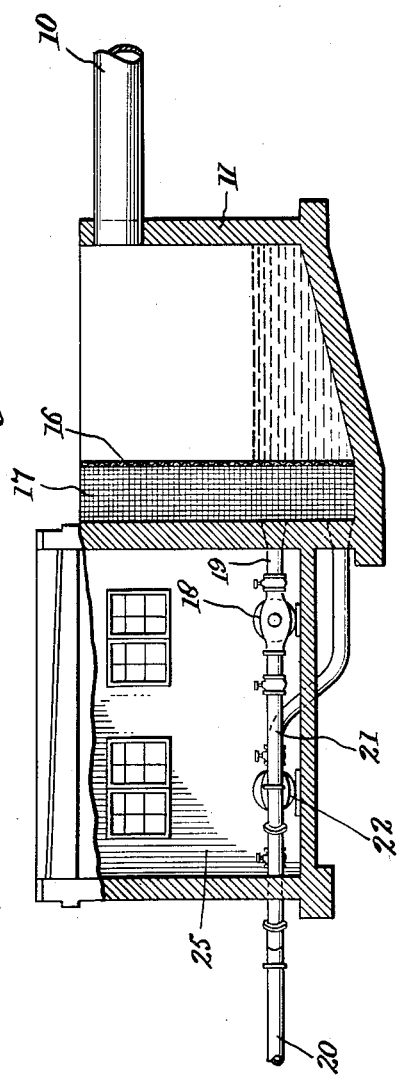

APPARATUS FOR THE PREPARATION OF SEWAGE FOR PUMPING

Walter Chase Munroe, Arnold, and Robert Brooks Morse, Hyattsville, Md.

Application April 27, 1931. Serial No. 533,288

1 Claim. (Cl. 210—2)

The present invention relates to improvements in methods and apparatus for the preparation of sewage for pumping, and has for an object generally to facilitate the pumping of sewage at greatly decreased cost.

The method generally accepted in present day practice is to lift sewage with pumps of the centrifugal type especially designed for that purpose.

In order to prevent clogging and stoppage through such pumps, the design and construction is based primarily upon the ability of the pump to pass solids, and all manner of waste material, which can only be accomplished at great sacrifice in pumping efficiency. The average pumping efficiency of trash pumps is as low as twenty-five percent and probably will not exceed sixty percent under any conditions. The average efficiency of a well designed water pump of the centrifugal type will average about eighty percent, or double that of the sewage pump, and, therefore, the cost of power to operate the sewage pump will be approximately double that required to operate the water pump.

It is obvious that in a sewage pumping station, of even moderate size, a saving of twenty to forty percent in power cost would be an appreciable item and it is, therefore, proposed to prepare raw sewage prior to pumping, so that the water content, which will be approximately ninety-eight percent of the total, can be successfully handled through high efficiency centrifugal pumps and the remaining solids and trash handled through trash pumps. By so doing, the overall efficiency of the plant would be greatly increased, and the power cost greatly decreased.

The method proposed for the preparation of sewage makes use of sedimentation to remove the heavy solids and screens where necessary to remove any light substance which might pass through the settling basin and clog the high efficiency pumps.

It proposes, alternately, the use of fine screens without sedimentation to remove both large and small solids which would clog the high efficiency pumps; and it proposes racks or coarse screens only, where necessary, to keep the trash pump from clogging.

In accordance with the method above outlined, a typical installation would include a basin for permitting the sewage to settle for a short period. The trash pumps would take suction from the bottom of the settling basin and discharge the heavy materials into the force mains. The liquid passing the tanks would be screened and passed on to the suctions of the high efficiency pumps for conveyance into the force mains, completing the operation at comparatively high overall efficiency. The exact ratio of water pumping capacity to trash pumping capacity would depend upon the total amount and kind of sewage waste matter handled.

In accordance with the alternative method outlined, a typical installation would include a suction well from which both the high efficiency and trash pumps would take their suction near the bottom. The suction inlet to the high efficiency pumps would be protected by a fine screen to allow only liquid to pass, while the suction inlet to the trash pumps would be protected only by such coarse racks of screens as might be necessary to exclude solids too large to pass through these pumps.

With the foregoing and other objects in view, the invention will be more fully described hereinafter, and will be more particularly pointed out in the claim appended hereto.

In the drawing, wherein like symbols refer to like or corresponding parts throughout the several views, Figure 1 is a top plan view with the parts shown in section of an apparatus for carrying out the method as above outlined.

Figure 2 is a vertical sectional view taken through the same.

Referring more particularly to the drawing, Figures 1 and 2, 10 designates a sewer pipe for conveying raw sewage to a receiving basin 11, having preferably a bottom 12 which slopes downwardly away from the pipe 10. A deep sump 13 is provided in one far corner of the receiving basin 11, being separated from the main body of the basin by a coarse screen 14. A compartment 15 is separated from the main body of the basin by a fine screen 16, and from the sump 13 by a fine screen 17. A high efficiency pump 18 is connected with the compartment 15 by a pipe 19, and with the force main 20 by a discharge pipe 21. A trash pump 22 is connected with the sump 13 at a low point by the pipe 23, and with the force main 20 by a discharge pipe 24. The pumps 18 and 22 may be located in a pump house 25.

In the operation of this form of the invention, the raw sewage enters the receiving basin 11 from the pipe 10 until level reaches a predetermined point; whereupon the pumps are put into operation. The sewage will pass through the screens 14, 16 and 17 to the sump 13, and the compartment 15. The trash and heavier material will pass the coarse screen 14, and be received in the sump 13, from which it is ejected by the low efficiency trash pump 22. The liquid passes the screens 16 and 17, and is removed from the compartment 15 by the high efficiency pump 18.

The low efficiency trash pump will be operated only at such times and for such lengths of time as necessary to remove the solids that accumulate in the receiving basin.

In Figures 1 and 2, the use of screens alone is indicated, and there is a suction well but no settling of solids to form sludge. With screening alone, the fine screen in front of the high efficiency pump is an important feature, and the coarse screens in front of the low efficiency trash pumps should be only fine enough to keep out solids of such size that will not pass through these pumps.

We claim:

An apparatus for the preparation and economical pumping of sewage, a receiving basin in communication at one side with a sewer, water works and trash pumps connected at separate points with the other side of said receiving basin at a low point therein, a relatively fine screen in the receiving basin extending about the connection to the water works pump for separating from the sewage and maintaining within the screen enclosure a free flowing free body of liquid available at all times to the water works pump, and a coarser screen in the basin extending about the connection therewith of the trash pump for admitting sludge and larger bodies in suspension to the trash pump but withholding very large foreign bodies.

WALTER CHASE MUNROE.
ROBERT BROOKS MORSE.